(12) United States Patent
Hintzer et al.

(10) Patent No.: US 10,696,831 B2
(45) Date of Patent: Jun. 30, 2020

(54) POLYOLEFIN COMPOSITION COMPRISING HOLLOW GLASS MICROSPHERES

(71) Applicant: 3M INNOVATIVE PROPERTIES COMPANY, St. Paul, MN (US)

(72) Inventors: Klaus Hintzer, Kastl (DE); Friedrich M. Wolff, Burghausen (DE); Bernd Gangnus, Herrsching (DE); Stefan V. Friedrich, Kastl (DE); Marcel Doering, Rhede (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/752,382

(22) PCT Filed: Aug. 11, 2016

(86) PCT No.: PCT/US2016/046539
§ 371 (c)(1),
(2) Date: Feb. 13, 2018

(87) PCT Pub. No.: WO2017/027700
PCT Pub. Date: Feb. 16, 2017

(65) Prior Publication Data
US 2019/0002678 A1   Jan. 3, 2019

(30) Foreign Application Priority Data

Aug. 13, 2015 (EP) .................................... 15180983

(51) Int. Cl.
| | | |
|---|---|---|
| *C08L 23/12* | (2006.01) | |
| *C08L 23/10* | (2006.01) | |
| *C08L 23/08* | (2006.01) | |
| *C08K 7/28* | (2006.01) | |
| *C08L 77/00* | (2006.01) | |
| *B29C 45/00* | (2006.01) | |
| *B29K 23/00* | (2006.01) | |
| *B29K 105/16* | (2006.01) | |
| *B29K 509/08* | (2006.01) | |

(52) U.S. Cl.
CPC ............... *C08L 23/12* (2013.01); *C08K 7/28* (2013.01); *C08L 23/08* (2013.01); *C08L 23/0846* (2013.01); *C08L 23/10* (2013.01); *C08L 77/00* (2013.01); *B29C 45/0001* (2013.01); *B29K 2023/12* (2013.01); *B29K 2105/165* (2013.01); *B29K 2509/08* (2013.01); *C08L 2205/03* (2013.01); *C08L 2205/035* (2013.01); *C08L 2205/08* (2013.01)

(58) Field of Classification Search
CPC ...... C08L 23/08; C08L 23/0846; C08L 23/10; C08L 23/12; C08L 77/00; C08K 7/28
See application file for complete search history.

(56) References Cited

U.S. PATENT DOCUMENTS

| | | | |
|---|---|---|---|
| 2,978,340 A | 4/1961 | Veatch | |
| 3,030,215 A | 4/1962 | Veatch | |
| 3,129,086 A | 4/1964 | Veatch | |
| 3,230,064 A | 1/1966 | Veatch | |
| 3,365,315 A | 1/1968 | Beck | |
| 4,391,646 A | 7/1983 | Howell | |
| 4,767,726 A | 8/1988 | Marshall | |
| 6,319,976 B1 * | 11/2001 | DeNicola, Jr. | ........ C08F 255/00 523/212 |
| 7,365,144 B2 | 4/2008 | Ka | |
| 7,569,626 B2 * | 8/2009 | Truckai | ............ A61B 17/12022 523/218 |
| 2006/0105053 A1 | 5/2006 | Marx | |
| 2006/0122049 A1 | 6/2006 | Marshall | |
| 2007/0116942 A1 | 5/2007 | D'Souza | |
| 2007/0191529 A1 | 8/2007 | Ka et al. | |
| 2007/0191530 A1 | 8/2007 | Ka et al. | |
| 2010/0279100 A1 | 11/2010 | Heikkila | |

FOREIGN PATENT DOCUMENTS

| | | |
|---|---|---|
| CN | 101775173 | 7/2010 |
| CN | 101831110 | 9/2010 |
| CN | 102329453 | 1/2012 |
| EP | 1709115 | 4/2007 |
| EP | 2424936 | 11/2017 |
| JP | S550-014750 A | 2/1975 |
| JP | H01-168742 A | 7/1989 |
| JP | H08-259771 A | 10/1996 |
| JP | 2011-195824 A | 10/2011 |
| JP | 2013-166817 | 8/2013 |
| KR | 2009-053219 | 5/2009 |
| WO | WO 2005-066262 | 7/2005 |
| WO | WO 2006-055612 | 5/2006 |
| WO | WO 2010-127117 | 11/2010 |
| WO | WO 2012-151178 | 11/2012 |
| WO | WO 2013-138158 | 9/2013 |
| WO | WO 2014-008123 | 1/2014 |
| WO | WO 2015-103099 | 12/2014 |

OTHER PUBLICATIONS

Q-Cel data sheet.*
International Search Report for PCT International Application No. PCT/US2016/046539, dated Oct. 6, 2016, 4 pages.
Stebani, "Faster-More Specific-More Efficient", Kunststoffe International, Sep. 2007, vol. 97, pp. 145-149.
Sun, Shaocan, "Plastic Practical Handbook", Zhejiang Science and Technology Press, Dec. 1999, pp. 171-172.

* cited by examiner

*Primary Examiner* — Edward J Cain
(74) *Attorney, Agent, or Firm* — Thomas M. Spielbauer

(57) ABSTRACT

The invention relates to a composition that includes a polyolefin, hollow glass microspheres, a polar semicrystalline thermoplastic additive, and at least one of an impact modifier or a compatibilizer. Articles made from the composition, a method of making such an article by melt processing the composition, and the use of the composition are also disclosed.

12 Claims, No Drawings

POLYOLEFIN COMPOSITION COMPRISING HOLLOW GLASS MICROSPHERES

CROSS REFERENCE TO RELATED APPLICATIONS

This application is a national stage filing under 35 U.S.C. 371 of PCT/US2016/046539, filed Aug. 11, 2016, which claims the benefit of European Application No. 15180983.7, filed Aug. 13, 2015, the disclosure of which is incorporated by reference in their entirety herein.

TECHNICAL FIELD

The present invention relates to a polyolefin composition comprising hollow glass microspheres with improved mechanical properties.

BACKGROUND

Hollow glass microspheres having an average diameter of less than about 500 micrometers, also commonly known as "glass microbubbles", "glass bubbles", "hollow glass beads", or "glass balloons" are widely used in industry, for example, as additives to polymeric compositions. In many industries, hollow glass microspheres are useful, for example, for lowering weight and improving processing, dimensional stability, and flow properties of a polymeric composition. Hollow glass microspheres have been incorporated into polypropylene composites for certain applications. See, for example, U.S. Pat. No. 7,365,144 (Ka et al.) The need for light weight solutions in polymer industry, for example for automotive applications, raises more and more interest in thermoplastic compounds including hollow glass microspheres.

The addition of glass bubbles to thermoplastics may, however, reduce the impact properties of the compounds. For polypropylene which is widely used in automotive interior applications also a decrease of tensile strength can be observed. In automotive interior applications, safety issues always have to be considered, and, therefore, the lack of sufficient impact properties, particularly notched impact strength, limits the possibilities to use thermoplastic compounds with added glass bubbles. In order to retain the impact properties, impact modifiers may be used. The positive effect on impact strength by impact modification combined with appropriate compatibilization was presented during the ANTEC conference 2014 (SPE ANTEC 2014, 2223-2228).

However, it has to be considered that the use of impact modifiers not only improves impact properties but also decreases strength and tensile modulus. For automotive interior applications, however, well balanced properties are required.

Therefore, a need still exists to improve the mechanical properties, i.e. tensile strength, tensile modulus and impact strength, of thermoplastic compounds with hollow glass microspheres.

SUMMARY

The present invention provides a polyolefin composition according to Claim 1, a masterbatch composition according to Claim 3, an article according to claim 16, a method of making an article according to Claim 17, and the use of such a composition according to Claim 18. Preferred and particularly expedient embodiments of the polyolefin composition and the masterbatch composition are specified in the dependent Claims 2 and 4 to 15.

The subject matter of the invention is consequently a composition comprising a polyolefin, hollow glass microspheres, a polar semicrystalline thermoplastic additive, and at least one of an impact modifier or a compatibilizer.

The subject matter of the invention is furthermore an article comprising such a composition when it is solidified.

The subject matter of the invention is furthermore a masterbatch composition for combining with a polyolefin, wherein the masterbatch comprises hollow glass microspheres and a polar semicrystalline thermoplastic additive. The masterbatch may further comprise at least one of an impact modifier or a compatibilizer. The masterbatch may or may not comprise a polyolefin.

The subject matter of the invention is furthermore a method of making an article, the method comprising melt processing the composition described above to make the article. Suitable examples of melt processing are injection molding, extrusion, blow molding, compression molding, transfer molding or rotomolding.

The compositions according to the invention are suitable, for example, for injection molding to prepare light weight articles typically having good tensile strength, tensile modulus, and impact strength. For the compositions disclosed herein, at least one of the impact strength, tensile strength, or tensile modulus of the compositions according to the invention approach or in some cases even surprisingly exceed the impact strength, tensile strength, or tensile modulus of similar polyolefin compositions comprising hollow glass microspheres, but which do not comprise polar semicrystalline thermoplastic additives. In some embodiments the impact strength is enhanced without sacrificing tensile modulus and/or tensile strength.

Very often a polypropylene composition with talc, e.g. with 5 to 20% by weight of talc, is used for automotive interior applications where the talc is needed to improve the surface properties but also to increase the tensile modulus. By the compositions according to the invention, talc can be at least partially substituted by hollow glass microspheres for density reduction, and the decrease in mechanical properties due to the addition of hollow glass microspheres can be compensated by using the synergistic effect of impact modifiers and/or compatibilizers, and polar semicrystalline thermoplastics. The resulting formulations are low in density, but show good mechanical properties.

The composition according to the invention may be processed in a very productive way, e.g. with shorter cycle times in injection molding. The composition shows a low isotropic shrinkage resulting in high quality articles with low warpage.

DETAILED DESCRIPTION

In the polyolefin composition according to the invention, the hollow glass microspheres may be present in a range from 0.2% to 49% by weight which corresponds to a volume filling of 1% to 70% by volume, the polar semicrystalline thermoplastic additive may be present in a range from 0.5% to 49.3% by weight, the impact modifier may be present in a range from 0% to 49.3% by weight, and the compatibilizer may be present in a range from 0% to 20% by weight, based on the total weight of the composition. At least one of an impact modifier or a compatiblizer must be present in the composition according to the invention.

If the polyolefin composition according to the invention comprises an impact modifier, preferably at least 0.5% by weight of the impact modifier are present in the composition, based on the total weight of the composition.

If the polyolefin composition according to the invention comprises a compatibilizer, preferably at least 0.5% by weight of the compatibilizer are present in the composition, based on the total weight of the composition.

In some embodiments, the composition according to the invention comprises a compatibilizer and an impact modifier.

While including hollow glass microspheres in polymeric compositions can provide many benefits, the process of adding glass bubbles into a polymer in a manufacturing process can pose some challenges. Handling glass bubbles may be similar to handling light powders. The hollow glass microspheres may not be easily contained and difficult to use in a clean environment. It can also be difficult to add an accurate amount of hollow glass microspheres to the polymer. Therefore, the present disclosure provides a masterbatch composition useful, for example, for incorporating hollow glass microspheres into a final, end-use melt processable thermoplastic composition. Delivering the hollow glass microspheres in a masterbatch composition can eliminate at least some of the handling difficulties encountered during manufacturing.

In the masterbatch composition according to the invention, the hollow glass microspheres may be present in a range from 20% to 60% by weight which corresponds to a volume filling of 25% to 70% by volume, and the polar semicrystalline thermoplastic additive may be present in a range from 1% to 80% by weight, based on the total weight of the composition.

If the masterbatch composition according to the invention comprises an impact modifier, the impact modifier may be present in a range from 0.5% to 79% by weight, based on the total weight of the composition. If the masterbatch composition according to the invention comprises a compatibilizer, the compatibilizer may be present in a range from 0.5% to 79% by weight, based on the total weight of the composition.

If the masterbatch composition according to the invention comprises a polyolefin, the polyolefin may be present in an amount of up to 79% by weight, based on the total weight of the composition.

Examples of polyolefins useful for the composition according to the invention include those made from monomers having the general structure CR1R2=CR3R4, wherein the groups R1, R2, R3 and R4 are hydrogen or an alkyl group having up to 20 carbon atoms or from one to eight carbon atoms and wherein at least two of the groups R1, R2, R3 and R4 are hydrogen. Two of the groups R1, R2, R3 and R4 may be connected and be part of a cyclo alkyl structure. R1 may be an aryl group, e.g. phenyl or alkyl substituted phenyl with the alkyl group having up to 20 carbon atoms or from one to eight carbon atoms. Examples of polyolefins useful for the composition according to the invention include homopolymers and copolymers having the general formula —[CR1R2-CR3R4]-, wherein R1 to R4 are defined as in any of the aforementioned embodiments. Suitable copolymers include block copolymers and random copolymers. Examples of suitable polyolefins include polyethylene; polypropylene; poly (1-butene); poly (3-methylbutene); poly (4-methylpentene); poly (2-butene); poly (2-methylpropene); copolymers of ethylene with at least one of propylene, 1-butene, 2-butene, 1-pentene, cyclo pentene, pentene, 1-hexene, 1-octene, 1-decene, 1-dodecene and 1-octadecene; copolymers of polypropylene with at least one of ethylene, 1-butene, 2-butene, 1-pentene, cyclo pentene, 4-methyl-1-pentene, 1-hexene, 1-octene, 1-decene, 1-dodecene and 1-octadecene. For the composition according to the invention, also blends of different polyolefins may be used. In some embodiments, blends of polyethylene and polypropylene may be used including blends of polyethylene and polyethylene copolymers and blends of polypropylene and polypropylene copolymers.

Typically, the compositions according to the invention comprise at least one of polyethylene or polypropylene. Preferably, the compositions according to the invention comprise polypropylene. It should be understood that a polyolefin comprising polyethylene may be a polyethylene homopolymer or a copolymer containing ethylene repeating units. Similarly, it should be understood that a polyolefin comprising polypropylene may be a polypropylene homopolymer or a copolymer containing propylene repeating units. The polyolefin comprising at least one of polyethylene or polypropylene may also be part of a blend of different polyolefins that includes at least one of polypropylene or polyethylene. Useful polyethylene polymers include high density polyethylene (e.g., those having a density of such as from 0.94 to about 0.98 g/cm$^3$) and linear or branched low-density polyethylenes (e.g. those having a density of such as from 0.89 to 0.94 g/cm$^3$). Useful polypropylene polymers include low impact, medium impact, or high impact polypropylene. A high impact polypropylene may be a copolymer of polypropylene including at least 80, 85, 90, or 95% by weight propylene repeating units, based on the weight of the copolymer. Suitable polyolefines can be obtained from a variety of commercial sources, for example, LyondellBasell, Rotterdam, Netherlands, under the trade designations "PRO-FAX", "HIFAX", "HOSTALEN", "HOSTACOM", "MOPLEN", "LUPOLEN" and "PURELL", and from Borealis, Vienna, Austria under the trade designations "BOREALIS PP", "BORMOD", "BORMED", "DAPLEN", "FIBREMOD" and "BOREALIS PE".

The polyolefin has a viscosity as measured by melt flow index. Depending on the melt processing method a polyolefin with an appropriate melt flow index may be selected, e.g. typically higher MFI grades are chosen for injection molding and lower ones for extrusion or compression molding. Typical MFI values of the polyolefin suitable for the composition according to the invention, as measured according to DIN EN ISO 1133, range from 0.5 to 120 g/10 min. The temperatures and loads to be applied for MFI measurement of the various polyolefins are listed in the appendix of DIN EN ISO 1133.

In the final composition suitable for melt processed articles, the polyolefin is typically the major component of the composition according to the invention. In general, the polyolefin provides at least 50% by weight, based on the total weight of the composition. The polyolefin may be present in an amount of up to 98.8% or up to 98% or up to 96.5% by weight, based on the total weight of the composition.

For example, the polyolefin may be present in a range from 50% to 98.8% or 50% to 98% or 50% to 96.5%, based on the total weight of the composition.

As already described above, a masterbatch composition according to the invention may or may not contain the polyolefin. In some embodiments, the masterbatch comprises the polyolefin, but at a lower percentage than in the final composition suitable for injection molding described above. In some embodiments, the masterbatch does not comprise the polyolefin. The process of combining a masterbatch with other compatible materials is commonly referred to as "letting down" the masterbatch. In the present disclosure, the composition that is made from the masterbatch (i.e. the final composition) can also be referred to as the let-down composition. A composition useful for letting down a masterbatch composition typically includes the polyolefin in a sufficient amount to make the let-down composition described above.

The hollow glass microspheres which are used for the polyolefin compositions according to the invention can be made by techniques known in the art (see, e.g., U. S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U. S. Pat. App. Pub. No. 2006/0122049 (Marshall et. al). Techniques for preparing hollow glass microspheres typically include heating milled frit, commonly referred to as "feed", which contains a blowing agent (e.g., sulfur or a compound of oxygen and sulfur). Frit can be made by heating mineral components of glass at high temperatures until molten glass is formed.

Although the frit and/or the feed may have any composition that is capable of forming a glass, typically, on a total weight basis, the frit comprises from 50 to 90 percent of $SiO_2$, from 2 to 20 percent of alkali metal oxide, from 1 to 30 percent of $B_2O_3$, from 0.005-0.5 percent of sulfur (for example, as elemental sulfur, sulfate or sulfite), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$), from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. Additional ingredients are useful in frit compositions and can be included in the frit, for example, to contribute particular properties or characteristics (for example, hardness or color) to the resultant glass bubbles.

In some embodiments, the hollow glass microspheres useful in the compositions according to the invention have a glass composition comprising more alkaline earth metal oxide than alkali metal oxide. In some of these embodiments, the weight ratio of alkaline earth metal oxide to alkali metal oxide is in a range from 1.2:1 to 3:1. In some embodiments, the hollow glass microspheres have a glass composition comprising $B_2O_3$ in a range from 2 percent to 6 percent based on the total weight of the glass bubbles. In some embodiments, the hollow glass microspheres have a glass composition comprising up to 5 percent by weight $Al_2O_3$, based on the total weight of the hollow glass microspheres. In some embodiments, the glass composition is essentially free of $Al_2O_3$. "Essentially free of $Al_2O_3$" may mean up to 5, 4, 3, 2, 1, 0.75, 0.5, 0.25, or 0.1 percent by weight $Al_2O_3$. Glass compositions that are "essentially free of $Al_2O_3$" also include glass compositions having no $Al_2O_3$. Hollow glass microspheres useful for practicing the invention may have, in some embodiments, a chemical composition wherein at least 90%, 94%, or even at least 97% of the glass comprises at least 67% $SiO_2$, (e.g., a range of 70% to 80% $SiO_2$), a range of 8% to 15% of an alkaline earth metal oxide (e.g., CaO), a range of 3% to 8% of an alkali metal oxide (e.g., $Na_2O$), a range of 2% to 6% $B_2O_3$, and a range of 0.125% to 1.5% $SO_3$. In some embodiments, the glass comprises in a range from 30% to 40% Si, 3% to 8% Na, 5% to 11% Ca, 0.5% to 2% B, and 40% to 55% O, based on the total of the glass composition.

The "average true density" of hollow glass microspheres is the quotient obtained by dividing the mass of a sample of hollow glass microspheres by the true volume of that mass of hollow glass microspheres as measured by a gas pycnometer. The "true volume" is the aggregate total volume of the hollow glass microspheres, not the bulk volume. The average true density of the hollow glass microspheres useful for the composition according to the invention is generally at least about 0.2 grams per cubic centimeter ($g/cm^3$), 0.25 $g/cm^3$, or 0.3 $g/cm^3$. In some embodiments, the hollow glass microspheres useful for the composition according to the invention have an average true density of up to about 0.65 $g/cm^3$. "About 0.65 $g/cm^3$" means 0.65 $g/cm^3$±five percent. In some of these embodiments, the average true density of the hollow glass microspheres is up to 0.6 $g/cm^3$ or 0.55 $g/cm^3$. For example, the average true density of the hollow glass microspheres disclosed herein may be in a range from 0.2 $g/cm^3$ to 0.65 $g/cm^3$, 0.25 $g/cm^3$ to 0.6 $g/cm^3$, 0.3 $g/cm^3$ to 0.60 $g/cm^3$, or 0.3 $g/cm^3$ to 0.55 $g/cm^3$. Hollow glass microspheres having any of these densities can be useful for lowering the density of the composition according to the invention, relative to polyolefin compositions that do not contain hollow glass microspheres.

The average true density can be measured using a pycnometer according to DIN EN ISO 1183-3. The pycnometer may be obtained, for example, under the trade designation "ACCUPYC II 1340 PYCNOMETER" from Micromeritics, Norcross, Ga., or under the trade designations "PENTAPYCNOMETER" or "ULTRAPYCNOMETER 1000" from Formanex, Inc., San Diego, Calif. Average true density can typically be measured with an accuracy of 0.001 $g/cm^3$. Accordingly, each of the density values provided above can be ±five percent.

A variety of sizes of hollow glass microspheres may be useful. As used herein, the term size is considered to be equivalent with the diameter and height of the hollow glass microspheres. In some embodiments, the hollow glass microspheres can have a median size by volume in a range from 10 to 60 micrometers (in some embodiments from 15 to 40 micrometers, 10 to 25 micrometers, 20 to 45 micrometers, 20 to 40 micrometers or 40 to 50 micrometers). The median size is also called the D50 size, where 50 percent by volume of the hollow glass microspheres in the distribution are smaller than the indicated size. The median size by volume is determined by laser light diffraction by dispersing the hollow glass microspheres in deaerated, deionized water. Laser light diffraction particle size analyzers are available, for example, under the trade designation "MASTERSIZER 2000" from Malvern Instruments, Malvern, UK.

The hollow glass microspheres useful in the compositions according to the invention typically need to be strong enough to survive the processing, in particular the injection molding process. A useful hydrostatic pressure at which ten percent by volume of the hollow glass microspheres collapses is at least about 20 (in some embodiments, at least about 38, 50, or 55) megapascals (MPa). "About 20 MPa" means 20 MPa±five percent. In some embodiments, a hydrostatic pressure at which ten percent by volume of the hollow glass microspheres collapses can be at least 100, 110, or 120 MPa. In some embodiments, a hydrostatic pressure at which ten percent by volume of the hollow glass microspheres collapses can be at least 170, 180 or 190 MPa.

For the purposes of the present disclosure, the collapse strength of the hollow glass microspheres is measured on a dispersion of the hollow glass microspheres in glycerol using ASTM D3102-72 "Hydrostatic Collapse Strength of Hollow Glass Microspheres"; with the exception that the sample size (in grams) is equal to 10 times the density of the glass bubbles. Collapse strength can typically be measured with an accuracy of ±about five percent. Accordingly, each of the collapse strength values provided above can be ±five percent.

Hollow glass microspheres useful for the composition of the invention can be obtained commercially and include those marketed by 3M Company, St. Paul, Minn., under the trade designation "3M GLASS BUBBLES" (e.g., grades S60, S60HS, iM30K, iM16K, S38HS, S38XHS, K42HS, K46, and H50/10000). Other suitable hollow glass microspheres can be obtained, for example, from Potters Industries, Valley Forge, Pa., (an affiliate of PQ Corporation) under the trade designations "SPHERICEL HOLLOW GLASS SPHERES" (e.g., grades 110P8 and 60P18) and "Q-CEL HOLLOW SPHERES" (e.g., grades 30, 6014, 6019, 6028, 6036, 6042, 6048, 5019, 5023, and 5028), from Silbrico Corp., Hodgkins, Ill. under the trade designation "SIL-CELL" (e.g., grades SIL 35/34, SIL-32, SIL-42, and SIL-43), and from Sinosteel Maanshan Inst. of Mining Research Co., Maanshan, China, under the trade designation "Y8000".

In some embodiments of the composition according to the invention, the hollow glass microspheres may be surface treated, e.g. with a coupling agent to enhance the interaction between the hollow glass microspheres and the polyolefin matrix or with an acid to avoid polymer degradation. In other embodiments the surface treating agent, e.g. a coupling agent or an acid, can be added directly to the composition. Examples of useful surface treatment agents are acids, e.g. phosphoric acid, and coupling agents including zirconates, silanes, or titanates. Coupling agents can also be part of polymeric structures which are coated on the surface of the hollow glass microspheres, i.e. functional siloxanes. If used, acids are typically applied in a range from 1 to 5% by weight, based on the total weight of the hollow glass microspheres in the composition. If used, coupling agents are commonly included in an amount of about 0.1 to 5%, preferably in an amount of 0.5 to 3% by weight, based on the total weight of the hollow glass microspheres in the composition.

Typical titanate and zirconate coupling agents are known to those skilled in the art and a detailed overview of the uses and selection criteria for these materials can be found in Monte, S.J., Kenrich Petrochemicals, Inc., "Ken-React® Reference Manual—Titanate, Zirconate and Aluminate Coupling Agents", Third Revised Edition, March, 1995.

Suitable silanes are coupled to glass surfaces through condensation reactions to form siloxane linkages with the siliceous glass. This treatment renders the filler more wettable or promotes the adhesion of materials to the hollow glass microsphere surface. This provides a mechanism to bring about covalent, ionic or dipole bonding between hollow glass microspheres and organic matrices. Silane coupling agents are chosen based on the particular functionality desired.

Useful silanes include amino functional silanes, e.g. N-2-(aminoethyl)-3-aminopropyltrimethoxysilane, (3-aminopropyl)trimethoxysilane, (3-aminopropyl)triethoxysilane, aminophenyltrimethoxysilane, 4-aminobutyltriethoxysilane, 3-aminopropyltris(methoxyethoxyethoxy)silane, 3-(m-aminophenoxy)propyltrimethoxysilane and N-(2-aminoethyl)-11-aminoundecyltrimethoxysilane; epoxy functional silanes, e.g. (3-glycidyloxypropyl)trimethoxysilane; methacryloxy functional silanes, e.g. 3-methacryloxypropyltrimethoxysilane; vinyl functional silanes, e.g. vinyltriethoxysilane and vinyltris(2-methoxyethoxy)silane; alkyl silanes, e.g. octyltriethoxysilane, hexadecyltrimethoxysilane and mercapto functional silanes.

Suitable silane coupling strategies are outlined in Silane Coupling Agents: Connecting Across Boundaries, by Barry Arkles, Gelest Broschure ($3^{rd}$ edition) 2014, Gelest Inc. Morrisville, Pa., or Silane Coupling Agents ($2^{nd}$ edition), by Edwin P. Plueddemann, Plenum Press, New York, 1991.

Although the surface treatment with e.g. coupling agents is useful in some embodiments, advantageously, the compositions according to the invention provide good mechanical properties even in the absence of coupling agents. The mechanical properties achieved may be understood by a person skilled in the art to be due to good adhesion between the hollow glass microspheres and the polyolefin matrix. Accordingly, in some embodiments, the hollow glass microspheres in the compositions according to the invention are not surface treated with e.g. a silane coupling agent. Further, in some embodiments, compositions according to the invention are substantially free of a surface treatment agent, e.g. silane coupling agent. Compositions substantially free of surface treatment agents, e.g. silane coupling agents, may be free of surface treatment agents, e.g. silane coupling agents, or may have surface treatment agents, e.g. silane coupling agents, present at a level of less than 0.05, 0.01, 0.005, or 0.001 percent by weight, based on the total weight of the composition.

In a let-down (i.e., final) composition suitable for melt processing, the hollow glass microspheres may be present in the composition disclosed herein at a level of at least 0.2 percent by weight, based on the total weight of the composition. In some embodiments, the hollow glass microspheres are present in the composition according to the invention at a level of at least 0.5 percent by weight, and in some embodiments at a level of at least 1.0 percent by weight, based on the total weight of the composition. In some embodiments, the hollow glass microspheres are present in the composition at least at 3, 5, or 8 percent by weight based on the total weight of the composition. In some embodiments, the hollow glass microspheres are present in the composition at a level of up to 49, 40, 30, 25, or 20 percent by weight, based on the total weight of the composition. For example, the hollow glass microspheres may be present in the composition in a range from 0.2 to 49, 0.5 to 40, 1 to 30, 3 to 49, 3 to 40, 3 to 30 or 3 to 20 percent by weight, based on the total weight of the composition.

In the masterbatch composition according to the invention, the hollow glass microspheres may be present in an amount of at least 20 percent by weight, based on the total weight of the composition. In some embodiments, the hollow glass microspheres are present in the composition at a level of up to 60, 55, or 50 percent by weight, based on the total weight of the composition. For example, the hollow glass microspheres may be present in the composition in a range from 20 to 60, 20 to 55, or 20 to 50 percent by weight, based on the total weight of the composition.

The impact modifier useful for the compositions according to the invention is a polymeric substance that enhances the impact properties or toughness of a composition. Typically the impact modifier has a lower tensile or flexural modulus or Shore hardness than the base resin of the composition. The impact modifier can be chemically cross-linked or non-crosslinked. The term "crosslinked" refers to joining polymer chains together by covalent chemical bonds, usually via crosslinking molecules or groups, to form a network polymer.

The impact modifier which is used for the compositions according to the invention also may be a polyolefin. The impact modifier which is used for the compositions according to the invention may be free of polar functional groups or may have polar functional groups.

In some embodiments, the impact modifier is free of polar functional groups and includes only carbon-carbon and carbon-hydrogen bonds. In some embodiments, the impact modifier is an ethylene propylene copolymer or elastomer, an ethylene octene copolymer or elastomer, an ethylene propylene diene elastomer, an ethylene propylene octene copolymer or elastomer, polybutadiene, a butadiene copolymer, polybutene, or a combination thereof. In some embodiments, the impact modifier is an ethylene alpha-olefin copolymer or a propylene alpha-olefin copolymer. In some embodiments, the impact modifier is an ethylene octene elastomer. In some embodiments the impact modifier is a random copolymer or a block copolymer. In some embodiments the impact modifier is a thermoplastic elastomer (TPE) which can be a TPO, TPV, TPU, TPC, TPS, or TPA as defined in DIN EN ISO 18064. In some embodiments the impact modifier is an acrylic elastomer.

In some embodiments, the impact modifier has polar functional groups. A polar functional group is a functional group that includes at least one atom that is more electronegative than carbon. Common elements of organic compounds that are more electronegative than carbon are oxygen, nitrogen, sulfur, and halogens.

In some embodiments, a polar functional group is a functional group that includes at least one oxygen atom. Such groups include hydroxyl, hydroperoxy, peroxy or oxirane groups and carbonyl groups, e.g., such as those in ketones, aldehydes, carboxylic acids, carboxyamides, carboxyimides, carboxylic acid anhydrides, carboxyhalides, carboxylic acid esters, and carbonates. In some embodiments, a polar functional group is a functional group that includes at least one nitrogen atom. Such groups include amino, imino, amido, imido, hydroxamido, hydrazido, cyanato, isocyanato, cyano (e.g. nitrils), isocyano, nitrooxy, nitro, nitrosooxy, nitroso, azido, azo and ammonium groups. In some embodiments, a polar functional group is a functional group that includes at least one sulfur atom. Such groups include hydrosulfido, sulfido, polysulfido, thiocyanato, isothiocyanato, sulfonyl, sulfinyl or sulfonic acid groups and sulfonium groups.

In some embodiments the polar functional group may be randomly distributed in the impact modifier. In other embodiments the impact modifier can be made up out of different blocks which can comprise different polar functional groups or where some blocks contain polar functional groups and some do not contain polar functional groups. In some other embodiments the polar functional groups are grafted onto a polymer that does not contain polar functional groups or that contains different polar functional groups itself. The grafting process is a radical mediated process that involves reaction of a monomer comprising the polar functional group or a mixture of monomers, of which at least one comprises the polar functional group, and a polymer.

For impact modifiers having polar functional groups, suitable polar functional groups are maleic anhydride (MAH), itaconic anhydride (IAH) or citraconic anhydride (CAH), N-substituted maleimides, fumaric acid, maleic acid, itaconic acid, citraconic acid, acrylic acid, and other carboxylic acids and their derivates, e.g. esters, amides, imides and anhydrides. Examples for impact modifiers having polar functional groups are maleic anhydride grafted styrene-ethylene/butylene-styrene (SEBS-g-MAH) block copolymers, maleic anhydride grafted ethylene propylene diene (EPDM-g-MAH) copolymers, elastomeric maleic anhydride functionalized ethylene copolymers and elastomeric maleic anhydride functionalized propylene copolymers.

Impact modifiers typically can have a molar mass ranging from 1000 to 1000000 g/mol or from 5000 to 500000 g/mol.

Suitable impact modifiers can be obtained, for example, from Dow Chemical Company, Midland (Mich.), USA, under the trade designations "INFUSE" and "ENGAGE", from ExxonMobil Corporation, Irving (Tex.), USA, under the trade designation "SANTOPRENE" or from So.F.Ter, Forli, Italy, under the trade designation "FORPRENE". Suitable impact modifiers having polar functional groups can be obtained, for example, from Kraton Polymers, Houston (Tex.), USA, under the trade designation "KRATON FG" and from Addivant, Danbury (Conn.), USA, under the trade designation "ROYALTUF".

As already described above, the composition according to the invention may or may not comprise an impact modifier. If the composition according to the invention comprises an impact modifier, the impact modifier may be present in the composition, i.e. in the let-down composition, in an amount of at least 0.5, 1, 2, 3 or 5 percent by weight, based on the total weight of the composition. If the composition according to the invention comprises an impact modifier, the impact modifier may be present in an amount of up to 49.3, 40, 30, 20 or 15 percent by weight, based on the total weight of the composition. For example, impact modifier may be present in the composition in a range from 0.5 to 49.3, 0.5 to 40, 0.5 to 30, 3 to 49.3, 3 to 40, 3 to 30 or 3 to 15 percent by weight, based on the total weight of the composition. Less impact modifier may be required with a lower level of hollow glass microspheres. A composition for letting down a masterbatch may also include the impact modifier in any suitable range (e.g., any of the ranges described above) depending on the desired final composition.

If the masterbatch composition according to the invention comprises an impact modifier, the impact modifier may be present in the masterbatch composition in a range from 0.5 to 79 percent by weight, based on the total weight of the composition, as already described above. In some embodiments, impact modifier is present in the masterbatch composition in an amount of at least 5, 10, 15, or 20 percent by weight, based on the total weight of the composition. In some embodiments, impact modifier is present in the masterbatch composition in an amount of up to about 30, 40, 50, 60, 70 or 79 percent by weight, based on the total weight of the composition. In some embodiments of the masterbatch composition, the impact modifier is present in a range from 0.5 to 30, 0.5 to 50, 0.5 to 70, 5 to 30, 5 to 50, 5 to 70, 20 to 50 or 20 to 70 percent by weight, based on the total weight of the composition.

The compatibilizer useful for the compositions according to the invention is a polymeric substance comprising functional groups that are able to interact with the glass surface of the hollow glass microspheres or with a coating or sizing applied to the surface of the hollow glass microspheres. The interaction may be accomplished by covalent bonds, hydrogen bonds or ionic bonds. The covalent bonds may be non-polar bonds or polar bonds. If the interaction is accomplished by polar bonds, the compatibilizer includes polar functional groups. Examples of suitable polar functional groups are described above in connection with the impact modifier.

For compatibilizers having polar functional groups, preferred polar functional groups include an anhydride, e.g.

maleic anhydride; carboxylic acid groups, e.g. acrylic acid groups; epoxy groups, e.g. glycidylmethoxy groups; acrylate groups, e.g. glycidylmethacrylate (GMA); and nitril groups.

The polar functional groups may be grafted or co-polymerized to yield random copolymers and block copolymers. In some embodiments, the compatibilizer is a maleic anhydride modified polymer. In some embodiments, the compatibilizer is a maleic anhydride modified polyolefin, e.g. a maleic anhydride modified polypropylene or a maleic anhydride modified polyethylene.

Compatibilizers typically have a molar mass ranging from 500 to 500,000 g/mol or from 1,000 to 200,000 g/mol.

Suitable compatibilizers can be obtained, for example, from Dow Chemical Company, Midland (Mich.), USA, under the trade designation "AMPLIFY", from DuPont, Wilmington (Del.), USA, under the trade designation "FUSABOND", from ExxonMobile Corporation, Irving (Tex.), USA, under the trade designation "EXXELOR", from Addcomp, Nijverdal, Netherlands, under the trade designation "PRIEX", and from Addivant, Danbury (Conn.), USA, under the trade designation "POLYBOND".

The level of grafting or copolymerization, respectively, of the polar functional groups, e.g., the level of grafting of maleic anhydride in the modified polyolefin, may be from low to very high and typically is in a range from about 0.1 to about 5% by weight.

It is also possible to use compatibilizers which are combined impact modifiers and compatibilizers, i.e. the compatibilizer simultaneously acts as a compatiblizer and as an impact modifier. Examples of such combined impact modifiers and compatibilizers are maleic anhydride-modified block copolymers of styrene-ethylene/butylene-styrene (SEBS-g-MAH), maleic anhydride-modified ethylene copolymers, maleic anhydride-modified ethylene propylene diene (EPDM-g-MAH) copolymers and modified block copolymers. Such combined impact modifiers and compatibilizers are referred to herein as compatibilizers. Suitable combined compatibilizers and impact modifiers can be obtained, for example, from Kraton Polymers, Houston (Tex.), USA, under the trade designation "KRATON FG", and from Addivant, Danbury (Conn.), USA under the trade designation "ROYALTUF".

As already described above, the composition according to the invention may or may not comprise a compatibilizer. If the composition according to the invention comprises a compatibilizer, the compatibilizer may be present in the composition, i.e. in the let-down composition, in amount of at least 0.5, 1, 1.5, 2, 3, or 4 percent by weight, based on the total weight of the composition. If the composition according to the invention comprises a compatibilier, the compatibilizer may be present in an amount of up to 20, 15, or 10 percent by weight, based on the total weight of the composition. For example, compatibilizer may be present in the let-down composition in a range from 0.5% to 20% by weight, based on the total weight of the composition. In some embodiments, the compatibilizer may be present in the let-down composition in a range from 2% to 15% or 2% to 10% by weight, based on the total weight of the let-down composition.

If the masterbatch composition according to the invention comprises a compatibilizer, the compatibilizer may be present in the masterbatch composition in a range from 0.5 to 79% by weight, based on the total weight of the masterbatch composition, as already described above. In some embodiments, the compatibilizer may be present in the masterbatch composition in a range from 5 to 70%, 10 to 60% or 10 to 30% by weight, based on the total weight of the masterbatch composition.

The polar semicrystalline thermoplastic additive useful for the compositions of the invention is a thermoplastic polymer that comprises at least one polar functional group, i.e. a functional group that comprises at least one other element than carbon and hydrogen, such as oxygen, nitrogen, sulfur, or halogens, and that beside an amorphous phase forms crystalline domains during solidification. The polar semicrystalline thermoplastic additive has a melting peak during heating and a crystallization peak during solidification as measured by dynamic scanning calorimetry (DSC) according to DIN EN ISO 11357. Typical melting temperatures of the polar semicrystalline thermoplastic additive are in a range from 50° C. to 300° C. or from 100° C. to 280° C. or from 200° C. to 380° C.

Examples of suitable polar functional groups for the polar semicrystalline thermoplastic additive are described above in connection with the impact modifier.

Examples of polar semicrystalline thermoplastic additives useful for the compositions of the invention are polyamide, e.g. PA6, PA66, PA12, PA11, PA610, and PA612; vinyl polymers, e.g. ethylene vinyl alcohol copolymer, ethylene vinylacetate copolymers and polyvinylchloride; polyesters, e.g. polyethylene terephthalate and polybutylene terephthalate; polyester amide; polyketones; polyetherketones; polyetheretherketones; and polyarylene sulfides or a combination thereof, i.e. blends or copolymers.

In the final polyolefin composition suitable for melt processing (i.e. the let-down composition) the polar semicrystalline thermoplastic additive may be present in the composition disclosed herein at a level of at least 0.5 percent by weight, based on the total weight of the composition. In some embodiments, the polar semicrystalline thermoplastic additive is present in the composition according to the invention at a level of at least 1 or 2 percent by weight, based on the total weight of the composition. In some embodiments, the polar semicrystalline thermoplastic additive is present in the composition at a level of up to 49.3, 40, 30, 20 or 15 percent by weight, based on the total weight of the composition. For example, the polar semicrystalline thermoplastic additive may be present in the composition in a range from 0.5% to 49.3% by weight, based on the total weight of the composition, as already described above. In some embodiments, the polar semicrystalline thermoplastic additive is present in a range from 1% to 30% or 2% to 15% by weight, based on the total weight of the composition.

In the masterbatch composition, the polar semicrystalline thermoplastic additive may be present in a range from 1% to 80% by weight, based on the total weight of the masterbatch composition, as already described above. In some embodiments, the polar semicrystalline thermoplastic additive is present in a range from 2% to 75%, 3 to 70% or 15 to 60% by weight, based on the total weight of the masterbatch composition.

In some embodiments, the compositions according to and/or useful in the method according to the invention include one or more stabilizers (e.g., antioxidants or hindered amine light stabilizers (HALS)). For example, any of the compositions, masterbatch compositions, or the let-down compositions described herein can include one or more of such stabilizers. Examples of useful antioxidants include hindered phenol-based compounds and phosphoric acid ester-based compounds (e.g., those available from BASF, Ludwigshafen, Germany, under the trade designations "IRGANOX" and "IRGAFOS" such as "IRGANOX 1076" and "IRGAFOS 168", those available from Songwon Ind. Co, Ulsan, Korea, under the trade designations "SONGNOX", and butylated hydroxytoluene (BHT)). Antioxidants, when used, can be present in an amount from about 0.001 to 1 percent by weight based on the total weight of the composition. HALS are typically compounds that can scavenge free-radicals, which can result from photodegradation or other degradation processes. Suitable HALS include decanedioic acid, bis (2,2,6,6-tetramethyl-1-(octyloxy)-4-piperidinyl)ester. Suitable HALS include those available, for example, from BASF under the trade designations "TINUVIN" and "CHIMASSORB". Such compounds, when used, can be present in an amount from about 0.001 to 1 percent by weight based on the total weight of the composition.

Reinforcing or functional fillers may be useful in the composition according to the invention and/or useful in the method according to the invention. For example, any of the compositions, masterbatch compositions, or the let-down compositions described herein can include one or more of such reinforcing or functional fillers. Reinforcing filler can be useful, for example, for enhancing the tensile, flexural, and/or impact strength, and tensile and flexural modulus of the composition. Functional fillers provide additional physical or chemical properties to the composition.

Examples of useful reinforcing and/or functional fillers include silica (including nano-silica), metal oxides (e.g. aluminum oxide, titanium dioxide) and metal hydroxides (e.g. magnesium hydroxide, aluminum hydroxide). Other useful fillers are based on carbon including carbon black, graphite, carbon fibers, carbon nanotubes, and graphene. Other useful fillers are based on glass including glass fibers, glass flakes, glass beads, and ground glass. Other useful fillers include ceramics including ceramic fibers, ceramic beads, ceramic flakes, ceramic particles and ceramic aggregates. Other usefull fillers include polymer beads which can be solid or hollow and polymer fibers (e.g. polyamide fibers, polyester fibers, aramid fibers and Kevlar fibers). Other useful fillers include minerals or mineral derivates including talc (including fine talc and micro talc), calcium carbonate, titanium dioxide (including nano-titanium dioxide), wollastonite, basalt including basalt fibers, nepheline syenite, perlite including expanded perlite which can be of open or closed cellular nature, mica, silicates, clays including nano-clay, dolomite and Neuburg siliceous earth. Other useful fillers are based on natural renewable sources including wood flour, wood chips, walnut shells, hemp, corn silks, cellulose fibers, flax, bamboo, cork, kenaf, sisal, and jute. Other useful fillers include polymer particles with a melting temperature higher than the temperature applied for melt processing of the composition according to the invention, e. g. polytetrafluoroethylene (PTFE) including PTFE micro powders, suspension PTFE or emulsion PTFE powders. Other useful fillers include metals including metal fibers, metal flakes and metal beads which may be solid or hollow. All of the mentioned fillers may be in nano-scale and all of them may be surface treated.

In some embodiments, the composition is free of reinforcing or functional fillers or contains up to 30, 20, 15, 10 or 5 percent by weight reinforcing or functional filler, based on the total weight of the composition. For example, in some embodiments, the composition is free of talc or contains up to 30, 20, 15, 10 or 5 percent by weight talc or glass fibers, based on the total weight of the composition.

Other additives may be incorporated into the composition disclosed herein in any of the embodiments described above. Examples of other additives that may be useful, depending on the intended use of the composition, include preservatives, mixing agents, colorants, dispersants, floating or anti-setting agents, flow or processing agents, wetting agents, anti-ozonant, blowing agents, and odor scavengers. Any of the compositions, masterbatch compositions, or the let-down compositions described herein can include one or more of such additives.

The composition according to the invention can be compounded using standard compounding equipment commercially available like twin screw extruders or BUSS kneaders. Elevated temperatures (e.g., in a range from 100° C. to 300° C.) may be useful for mixing the components of the composition in an extruder. Hollow glass microspheres may be added to the composition preferably using a side feeder. Polar semicrystalline thermoplastic additive, compatibilizer and/or impact modifier may be added to the composition via the material hopper or introduced further downstream using a side feeder. The method of melt processing the composition disclosed herein can utilize any type of standard equipment like extruders or injection molding machines. The composition can also be manufactured using a direct compounding technology like the direct injection molding compounder available from KraussMaffei, Munich, Germany. The state-of-the-art compounding and processing knowledge related to hollow glass microspheres is documented in the brochure "3M™ Glass Bubbles—Compounding and Injection Molding Guidelines" available from 3M Company, St. Paul, Minn., U.S.A. and the book "Hollow glass microspheres for plastics, elastomers, and adhesives compounds" edited by Stephen E. Amos and Baris Yalcin, Elsevier, Amsterdam, 2015.

The composition and method according to the present disclosure are useful for making low density products (e.g., having a density in a range from 0.65 to 1.0, 0.7 to 0.95, or 0.7 to 0.9 grams per cubic centimeter) with good tensile strength, tensile modulus, and impact properties, which are useful properties for a variety of applications. If the composition according to the invention comprises reinforcing or functional fillers as described above, the density of the final composition will vary, depending on the amount and density of the chosen filler.

Articles that can be made by melt processing the compositions according to the present disclosure include hardhats, interior and exterior automotive components (e.g., hoods, trunks, bumpers, grilles, side claddings, rocker panels, fenders, tail-gates, wire and cable applications, instrument panels, consoles, interior trim, door panels, heater housings, battery supports, headlight housings, front ends, ventilator wheels, reservoirs, and soft pads), packaging and transportation materials (e.g. transport boxes, pallets, packaging films, containers, bottles, trays), articles for aerospace, marine, rail and other vehicle applications, household goods (e.g. bowls, plates, cutlery), toys, and articles for leisure and sports like canoes, surfboards, bikes, scooters, training bikes, hiking and mountaineering equipment.

EXAMPLES

Materials

TABLE 1

List of Materials used in the Examples

| Abbreviation | Material Description |
|---|---|
| PP | Polypropylene copolymer. Commercially available from Borealis, Vienna, Austria, under the trade designation |

TABLE 1-continued

List of Materials used in the Examples

| Abbreviation | Material Description |
|---|---|
| | "BF970MO". Melt flow index (MFI) 20 g/10 min (230° C./2.16 kg). |
| IM1 | Impact Modifier. Olefin block copolymer, commercially available from Dow Chemical Company, Midland (Michigan), USA, under the trade designation "Infuse 9000". |
| IM2 | Impact Modifier. PP/EPDM, thermoplastic vulcanisate, commercially available from ExxonMobil Corporation, Irving (Texas), USA, under the trade designation, Santoprene 201-55 TPV". |
| C1 | Compatibilizer. Maleic anhydride modified polypropylene (PP-g-MAH), commercially available from E. I. du Pont de Nemours and Company, Wilmington, USA, under the trade designation "Fusabond P613". |
| C2 | Combined impact modifier and compatibilizer. Maleic anhydride modified styrene-ethylene/butylene-styrene block copolymer (SEBS-g-MAH), commercially available from Kraton Polymers, Houston (Texas), USA, under the trade designation "Kraton FG 1924 GT". |
| PST1 | Polar semicrystalline thermoplastic additive. Polyamide (PA6), commercially available from BASF, Ludwigshafen, Germany, under the trade designation "Ultramid B27". |
| PST2 | Polar semicrystalline thermoplastic additive. Ethylene vinyl alcohol copolymer (EVOH), commercially available from Kuraray, Tokyo, Japan, under the trade designation "Eval H171". |
| PST3 | Polar semicrystalline thermoplastic additive. Polyethylene terephthalate (PET), commercially available from DSM, Heerlen, Netherlands, under the trade designation "Arnite D04 300". |
| GB1 | 3M ™ iM16K High-Strength Glass Bubbles with 16,000 psi crush strength, 20 micron median diameter and 0.46 g/cm$^3$ true density, commercially available from 3M Company, St.Paul, MN, USA, under the trade designation "3M iM16K Hi-Strength Glass Bubbles". |
| GB2 | Amino-silane treated version of glass bubbles 3M ™ iM16k. For the amino-silane treatment, glass bubbles GB1 were used adding 1.1 wt. % of 3-aminopropyltriethoxysilane (commercially available from e.g. Evonik, Germany, under the trade designation "AMEO") to the surface of the hollow glass bubbles. |
| Talc | Commercially available from Mondo Mineral, Amsterdam, Netherlands, under the trade designation "Finntalc M15". |

Silane Surface Treatment of Glass Bubbles

A Ross Mixer (available from Charles Ross & Son Company, Hauppauge, N.Y.) was charged with 1500 g of an 0.5 wt. % aqueous solution of 3-aminopropyltriethoxysilane (commercially available from Evonik, Germany, under the trade name "AMEO"). Glass bubbles (available from 3M Company, St. Paul, Minn., USA under the trade designation "iM16k") were slowly added under medium mix speed and a mixing time of 15 minutes. The addition of glass bubbles was done in such a way that a coating level of 1.1% by weight was achieved. The ensuing paste was poured into aluminum pans and dried overnight in a forced-air oven at 80° C. The dried glass bubbles were screened through a 180 micron screen to remove any clumps.

Compounding Procedure

Masterbatches with 26 wt. % of glass bubbles GB1 or GB2 were compounded in a co-rotating intermeshing 26 mm twin screw extruder (L/D: 55) equipped with 12 heating zones (40° C., 195° C., 210° C., 210° C., 210° C., 210° C., 210° C., 210° C., 210° C., 210° C., 210° C., 210° C.) and running at 300 rpm. Polypropylene polymer pellets PP were fed in zone 1 via a gravimetric resin feeder and then passed through a set of kneading blocks and conveying elements. The glass bubbles were introduced into the melt stream using a side feeder equipped with a gravimetric feeding system in zone 4. At the point of glass bubble side feeding as well as for the rest of the downstream processing, high channel depth conveying elements (OD/ID: 1.75) and mild distributive mixing elements were used. The extrudate was cooled in a water bath and, subsequently, pelletized.

Injection Molding

The compounding of the final compositions and the injection molding of the test specimen were performed in one process using a High Throughput Compounding (HTC) device developed by Polymaterials AG, Kaufbeuren, Germany. The HTC device used is a modified injection molding machine from Engel, Schwertberg, Austria, with two plastification/injection units and a system of integrated internal mixers for compounding Details on the device are published in Kunststoffe international, September 2007, pp. 145-149.

The processing temperature was 260° C. and thus high enough to melt all of the thermoplastic components in the compounds.

Some breakage of the glass bubbles during compounding and injection molding is unavoidable, however, the breakage rate of the glass bubbles was lower than 20% for all Examples described below. A standard ISO mold with cavities for tensile and impact bars was used for all molded parts. The injection molded specimens were kept on a lab bench at room temperature and under ambient conditions for at least 24 hours before performing any testing.

Test Methods

Density

Density of the molded parts was determined according DIN EN ISO 1183-3 using a gas pycnometer ("ACCUPYC II 1340 PYCNOMETER" from Micromeritics, Norcross, Ga., USA). Therefore, the mass of representative parts of the molded specimen was determined and, subsequently, the volume was determined by the gas pycnometer. The density then is calculated according the formula: density=mass/volume.

Mechanical Properties

Mechanical properties of the injection molded composites were measured using ISO standard test methods listed in Table 2. A tensile testing device Z010 from Zwick, Germany with a 10 kN load cell and tensile grips was used for determining the tensile properties. A Zwick HIT5.5P impact tester and its specimen notcher were used to measure room temperature Charpy notched impact strength of the molded parts. At least 5 different specimens from a given sample were tested in tensile and impact tests. Arithmetic average of the results was determined and reported in the following examples. The results were observed to be highly repeatable and the standard deviation in test results was observed to be typically in the range of 3-5% or lower.

TABLE 2

Property Test Methods

| Test (Unit) | DIN EN ISO |
|---|---|
| Tensile Modulus (MPa) 20° C. | 527 |
| Tensile Strength at yield (MPa) 20° C. | 527 |
| Charpy Notched Impact Strength (kJ/m$^2$) | 179 |

Comparative Examples 1-9 and Examples 1-4

Polypropylene Based Formulations with Addition of Polyamide (PA6)

Without any further additives, such as impact modifiers, compatibilizers or fillers, the addition of the polar semicrystalline thermoplastic additive PST1 decreases the tensile strength and Charpy notched impact strength of the compounds based on PP and GB1 (compare Comparative Examples 1 and 2 (CEX1 and CEX2) in Table 3). The further addition of a compatibilizer C1 significantly increased the tensile strength and surprisingly also the Charpy notched impact strength while the modulus is kept constant (compare Comparative Examples 1 and 2 (CEX1 and CEX2) to Example 1 (EX1) in Table 3).

and 7 (CEX6 and CEX7) in Table 3). Adding to this composition the polar semicrystalline thermoplastic additive PST1, a significant increase of the tensile strength and also the Charpy notched impact strength is observed while the tensile modulus is kept constant (compare Comparative Examples 6 and 7 (CEX6 and CEX7) to Example 3 (EX3) in Table 3).

A positive effect of the polar semicrystalline thermoplastic additive PST1 can also be seen for the silane surface treated GB2. In this case the combination of the polar semicrystalline thermoplastic additive PST1 with the compatibilizer C1 results in an improvement of the tensile strength and also the tensile modulus (compare Comparative Examples 8 and 9 (CEX8 and CEX9) to Example 4 (EX4) in Table 3).

TABLE 3

Polypropylene Based Formulations with Addition of Polyamide (PA6)

| Example No. | CEX1 | CEX2 | EX1 | CEX3 | CEX4 | CEX5 | EX2 | CEX6 | CEX7 | EX3 | CEX8 | CEX9 | EX4 |
|---|---|---|---|---|---|---|---|---|---|---|---|---|---|
| PP [wt. %] | 95 | 87 | 85 | 86 | 78 | 80 | 72 | 85 | 79 | 74 | 76 | 70 | 62 |
| C1 [wt. %] | — | — | 6 | — | — | — | — | — | 6 | 3 | — | 6 | 6 |
| C2 [wt. %] | — | — | — | — | — | 6 | 6 | — | — | — | — | — | — |
| IM1 [wt. %] | — | — | — | — | — | — | — | — | — | — | — | — | — |
| IM2 [wt. %] | — | — | — | — | — | — | — | — | — | — | — | — | — |
| PST1 [wt. %] | — | 8 | 4 | — | 8 | — | 8 | — | — | 8 | — | — | 8 |
| Talc [wt. %] | — | — | — | — | — | — | — | 10 | 10 | 10 | 10 | 10 | 10 |
| GB1 [wt. %] | 5 | 5 | 5 | 14 | 14 | 14 | 14 | 5 | 5 | 5 | — | — | — |
| GB2 [wt. %] | — | — | — | — | — | — | — | — | — | — | 14 | 14 | 14 |
| Density [g/cm$^3$] | 0.87 | 0.88 | 0.87 | 0.82 | 0.82 | 0.82 | 0.83 | 0.93 | 0.92 | 0.94 | 0.90 | 0.89 | 0.91 |
| Tensile Modulus [MPa] | 1500 | 1500 | 1500 | 1700 | 1700 | 1200 | 1200 | 1900 | 1900 | 1900 | 2000 | 2160 | 2240 |
| Tensile Strength [MPa] | 21 | 19 | 26 | 15 | 14 | 16 | 17 | 20 | 22 | 26 | 16 | 26 | 28 |
| Charpy Notched Impact Strength [kJ/m$^2$] | 3.9 | 3.0 | 4.5 | 2.2 | 2.2 | 2.2 | 8.1 | 2.9 | 2.5 | 3.7 | 2.2 | 2.6 | 2.6 |

The same correlation is true for higher contents of hollow glass microspheres GB1 where the addition of merely the polar semicrystalline thermoplastic additive PST1 does not improve the mechanical properties (compare Comparative Examples 3 and 4 (CEX 3 and CEX4) in Table 3). The addition of the combined impact modifier and compatibilizer C2 to the compound with 14 wt. % GB1 reduces the tensile modulus as expected but has no positive effect on the Charpy notched impact strength and only a minor influence on the tensile strength (compare Comparative Examples 3 and 5 (CEX3 and CEX5) in Table 3). As the polar semicrystalline thermoplastic additive PST1 is combined with the combined impact modifier and compatibilizer C2, the Charpy notched impact strength is increased significantly and in addition a further improvement of the tensile strength is observed (compare Comparative Examples 3, 4, and 5 (CEX3, CEX4 and CEX5) to Example 2 (EX2) in Table 3). In the presence of talc the addition of the compatibilizer C1 slightly increases the tensile strength but decreases the Charpy notched impact strength (compare Comparative Examples 6

Comparative Examples 10-12 and Examples 5-7

Polypropylene Based Formulations with Addition of Ethylene Vinyl Copolymer

In a composition where the combined impact modifier and compatibilizer C2 is used together with GB1, the further addition of the polar semicrystalline thermoplastic additive PST2 results in a significant increase of the Charpy notched impact strength while tensile strength and modulus remain constant (compare Comparative Examples 10 (CEX10) to Example 5 (EX5) in Table 4).

The tensile strength and modulus of a formulation containing impact modifier IM2 can be increased by adding the polar semicrystalline thermoplastic additive PST2 and the compatibilizer C1 (compare Comparative Examples 11 (CEX11) to Example 6 (EX6) in Table 4). In a formulation with talc and the compatibilizer C1, the addition of the polar semicrystalline thermoplastic additive PST2 significantly increases the tensile strength and the Charpy notched impact strength (compare Comparative Example 12 (CEX12) to Example 7 (EX7) in Table 4).

TABLE 4

Polypropylene Based Formulations with Addition of Ethylene Vinyl Copolymer

| Example No. | CEX10 | EX5 | CEX11 | EX6 | CEX12 | EX7 |
|---|---|---|---|---|---|---|
| PP [wt. %] | 89 | 81 | 85 | 75 | 70 | 62 |
| C1 [wt. %] | — | — | — | 6 | 6 | 6 |
| C2 [wt. %] | 6 | 6 | — | — | — | — |
| IM1 [wt. %] | — | — | — | — | — | — |

TABLE 4-continued

Polypropylene Based Formulations with Addition of Ethylene Vinyl Copolymer

| Example No. | CEX10 | EX5 | CEX11 | EX6 | CEX12 | EX7 |
|---|---|---|---|---|---|---|
| IM2 [wt. %] | — | — | 10 | 10 | — | — |
| PST2 [wt. %] | — | 8 | — | 4 | — | 8 |
| Talc [wt. %] | — | — | — | — | 10 | 10 |
| GB1 [wt. %] | 5 | 5 | 5 | 5 | 14 | 14 |
| GB2 [wt. %] | | | | | | |
| Density [g/cm$^3$] | 0.86 | 0.88 | 0.87 | 0.87 | 0.89 | 0.89 |
| Tensile Modulus [MPa] | 1250 | 1200 | 1250 | 1350 | 2150 | 2210 |
| Tensile Strength [MPa] | 19 | 19 | 18 | 22 | 19 | 26 |
| Charpy Notched Impact Strength [kJ/m$^2$] | 4.1 | 6.9 | 4.8 | 4.9 | 1.5 | 2.4 |

Comparative Example 13 and Example 8

Polypropylene Based Formulations with Addition of Polyethylene Terephthalate

In a formulation with the combined compatibilizer and impact modifier C2, the Charpy notched impact strength is increased significantly, while the tensile modulus and tensile strength are kept almost constant by adding the impact modifier IM1 and the polar semicrystalline thermoplastic additive PST3 (compare Comparative Example 13 (CEX13) to Example 8 (EX8) in Table 5).

TABLE 5

Polypropylene Based Formulations with Addition of Polyethylene Terephthalate

| Example No. | CEX13 | EX8 |
|---|---|---|
| PP [wt. %] | 80 | 67 |
| C1 [wt. %] | — | — |
| C2 [wt. %] | 6 | 6 |
| IM1 [wt. %] | — | 5 |
| IM2 [wt. %] | — | — |
| PST3 [wt. %] | — | 8 |
| Talc [wt. %] | — | — |
| GB1 [wt. %] | 14 | 14 |
| GB2 [wt. %] | — | — |
| Density [g/cm$^3$] | 0.82 | 0.85 |
| Tensile Modulus [MPa] | 1280 | 1200 |
| Tensile Strength [MPa] | 16 | 17 |
| Charpy Notched Impact Strength [kJ/m$^2$] | 2.2 | 6.3 |

Exemplary embodiments include the following:

Embodiment 1

A composition comprising a polyolefin, hollow glass microspheres, a polar semicrystalline thermoplastic additive, and at least one of an impact modifier or a compatibilizer.

Embodiment 2

The composition of embodiment 1, wherein the hollow glass microspheres are present in a range from 0.2% to 49% by weight, the polar semicrystalline thermoplastic additive is present in a range from 0.5% to 49.3% by weight, the impact modifier is present in a range from 0% to 49.3% by weight, and the compatibilizer is present in a range from 0% to 20% by weight, based on the total weight of the composition.

Embodiment 3

A masterbatch composition for combining with a polyolefin, wherein the masterbatch comprises hollow glass microspheres and a polar semicrystalline thermoplastic additive.

Embodiment 4

The masterbatch composition of embodiment 3, further comprising a polyolefin.

Embodiment 5

The masterbatch composition of embodiment 3 or 4, further comprising at least one of an impact modifier or a compatibilizer.

Embodiment 6

The masterbatch composition of any one of embodiments 3 to 5, wherein the hollow glass microspheres are present in a range from 20% to 60% by weight and the polar semicrystalline thermoplastic additive is present in a range from 1% to 80% by weight.

Embodiment 7

The composition of any one of embodiments 1 to 2 or 4 to 6, wherein the polyolefin comprises at least one of polypropylene or polyethylene.

Embodiment 8

The composition of any one of embodiments 1 to 7, wherein the polar semicrystalline thermoplastic additive is polyamide, a vinyl polymer, a polyester, a polyketone, a polyetherketone, a polyetheretherketone, a polyarylene sulfide or a combination thereof.

Embodiment 9

The composition of any one of embodiments 1 to 2 or 5 to 8, wherein the compatiblizer is a maleic anhydride-modified polymer.

Embodiment 10

The composition of any one of embodiments 1 to 2 or 5 to 9, wherein the impact modifier is free of polar functional groups.

Embodiment 11

The composition of any one of embodiments 1 to 2 or 5 to 9, wherein the impact modifier has polar functional groups.

Embodiment 12

The composition of embodiment 11, wherein the polar functional group is maleic anhydride (MAH), itaconic anhydride (IAH) or citraconic anhydride (CAH), acrylic acid, maleic acid, itaconic acid, citraconic acid or another carboxylic acid.

Embodiment 13

The composition of any one of embodiments 1 to 12, wherein the hollow glass microspheres are surface treated with a silane coupling agent.

Embodiment 14

The composition of any one of embodiments 1 to 13, further comprising expanded perlite.

Embodiment 15

The composition of any one of embodiments 1 to 14, wherein the hydrostatic pressure at which ten percent by volume of the hollow glass microspheres collapses is at least 100 MPa.

Embodiment 16

An article comprising the composition of any one of embodiments 1 to 15, wherein the composition is a solid.

Embodiment 17

A method of making an article, the method comprising melt processing the composition of any one of embodiments 1 to 15 to make the article.

Embodiment 18

Use of the composition of any one of embodiments 1 to 15 for making hardhats, interior and exterior automotive components, packaging and transportation materials, articles for aerospace, marine, rail and other vehicle applications, household goods, toys, and articles for leisure and sports.

The invention claimed is:

1. A composition comprising polypropylene, hollow glass microspheres having an average true density in a range from 0.2 g/cm$^3$ to 0.65 g/cm$^3$, a polar semicrystalline thermoplastic additive, and at least one of an impact modifier or a compatibilizer;
   wherein the polar semicrystalline thermoplastic additive is polyamide, a vinyl polymer, a polyester, or a combination thereof; and
   wherein the compatibilizer is a maleic anhydride-modified polymer.

2. The composition of claim 1, wherein the hollow glass microspheres are present in a range from 0.2% to 49% by weight, the polar semicrystalline thermoplastic additive is present in a range from 0.5% to 49.3% by weight, the impact modifier is present in a range from 0% to 49.3% by weight, and the compatibilizer is present in a range from 0% to 20% by weight, based on the total weight of the composition.

3. The composition of claim 1, wherein the hollow glass microspheres are present in a range from 20% to 60% by weight and the polar semicrystalline thermoplastic additive is present in a range from 1% to 80% by weight.

4. The composition of claim 1, wherein the polar semicrystalline thermoplastic additive is a vinyl polymer, a polyester, or a combination thereof.

5. The composition of claim 1, wherein the impact modifier is free of polar functional groups.

6. The composition of claim 1, wherein the impact modifier has polar functional groups.

7. The composition of claim 6, wherein the polar functional group is maleic anhydride (MAH), itaconic anhydride (IAH) or citraconic anhydride (CAH), acrylic acid, maleic acid, itaconic acid, citraconic acid or another carboxylic acid.

8. The composition of claim 1, wherein the hollow glass microspheres are surface treated with a silane coupling agent.

9. A composition comprising polypropylene, hollow glass microspheres having an average true density in a range from 0.2 g/cm$^3$ to 0.65 g/cm$^3$, a polar semicrystalline thermoplastic additive, and at least one of an impact modifier or a compatibilizer;
   wherein the polar semicrystalline thermoplastic additive is polyamide, a vinyl polymer, a polyester, or a combination thereof; and
wherein the compatibilizer is a maleic anhydride-modified polymer, the composition further comprising expanded perlite.

10. The composition of claim 1, wherein the hydrostatic pressure at which ten percent by volume of the hollow glass microspheres collapses is at least 100 MPa.

11. An article comprising the composition of claim 1, wherein the composition is a solid.

12. A method of making an article, the method comprising melt processing the composition of claim 1 to make the article.

* * * * *